United States Patent

[11] 3,581,521

| [72] | Inventors | John P. Eberz<br>Syracuse, N.Y.;<br>Richard A. English, Indianapolis, Ind. |
|---|---|---|
| [21] | Appl. No. | 820,755 |
| [22] | Filed | May 1, 1969 |
| [45] | Patented | June 1, 1971 |
| [73] | Assignee | Carrier Corporation<br>Syracuse, N.Y. |

[54] REFRIGERANT DISTRIBUTOR FOR AN ABSORPTION REFRIGERATION MACHINE
6 Claims, 3 Drawing Figs.

[52] U.S. Cl. .................................................. 62/494
[51] Int. Cl. .................................................. F25b 15/04

[50] Field of Search ................................ 62/476, 484, 494; 261/77

[56] References Cited
UNITED STATES PATENTS

| 3,210,057 | 10/1965 | Deady, Jr. et al. | 62/499X |
| 3,423,951 | 1/1969 | Eisberg | 62/484X |

*Primary Examiner*—Martin P. Schwadron
*Assistant Examiner*—P. D. Ferguson
*Attorneys*—Harry G. Martin, Jr. and J. Raymond Curtin

ABSTRACT: An absorption refrigeration system employing a distributor for mixing refrigerant vapor from the evaporator with strong solution from the generator to provide a mixture thereof to separate circuits of a multicircuit absorber.

PATENTED JUN 1 1971

3,581,521

INVENTORS.
JOHN P. EBERZ.
RICHARD A. ENGLISH.
BY James E Schardt
ATTORNEY.

3,581,521

REFRIGERANT DISTRIBUTOR FOR AN ABSORPTION REFRIGERATION MACHINE

BACKGROUND OF THE INVENTION

In absorption refrigeration machines employing air-cooled absorbers having a number of circuits therethrough, it is desirable to mix refrigerant vapor from the evaporator with strong solution from the generator prior to passage to the absorber. This assures that adequate proportions of vapor and strong solution are provided to each absorber circuit to increase performance of the absorption refrigeration machine. It is also desirable to provide suitable means such as a check valve between the absorber and the evaporator to prevent liquid from flowing through the distributor to the evaporator upon shutdown.

SUMMARY OF THE INVENTION

The present invention provides an absorption refrigeration system including a distributor for intimately mixing refrigerant vapor and strong solution and providing equal proportions of the mixture to separate circuits of the absorber. The distributor includes a vertically extending tubular member adapted to pass refrigerant in an upward direction within the distributor casing and a horizontally extending tubular member for introducing strong solution from the generator into the casing in the path of refrigerant flow therethrough to assure adequate mixing therebetween. Radially spaced outwardly extending tubes above the strong solution entrance in the casing are provided for passing the vapor-solution mixture to individual circuits of a multicircuit absorber. A valve plate adapted for seating engagement with the upper end of the vertically extending tubular member is adapted to prevent strong solution flow from the generator through the distributor to the evaporator upon machine shutdown.

DESCRIPTION OF THE PREFERRED EMBODIMENT

Figures 1, 2, 3:
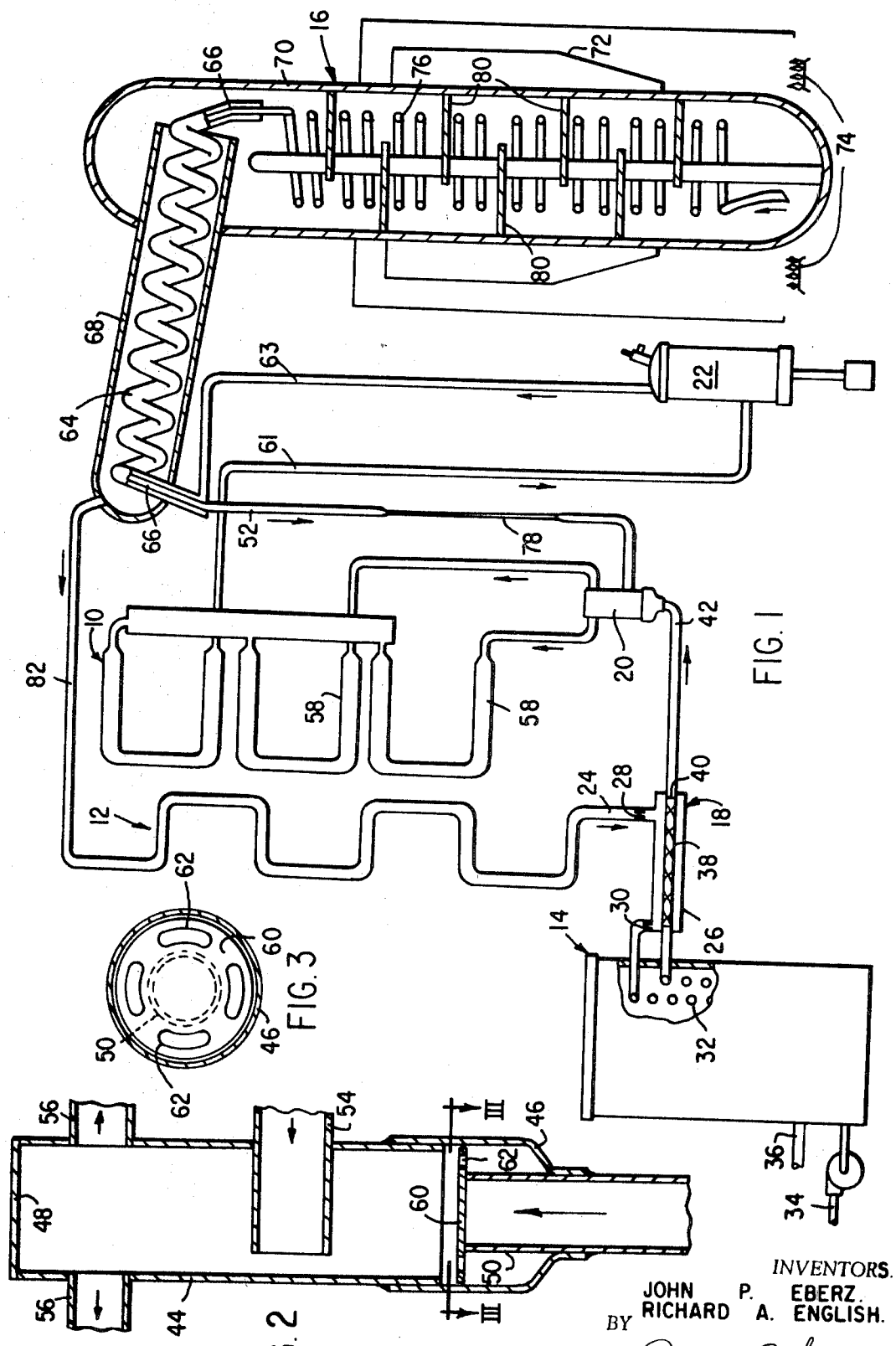
FIG. 1 is a schematic diagram of an absorption refrigeration system.
FIG. 2 is an enlarged, partially sectional view of the strong solution-vapor distributor employed with the absorption refrigeration system of FIG. 1.
FIG. 3 is a sectional view taken along line III–III of FIG. 2.

Referring to FIG. 1 of the drawing, there is shown a refrigeration system comprising an absorber 10, a condenser 12, an evaporator or chiller 14, a generator 16, a liquid-suction heat exchanger 18, and a vapor distributor 20 connected to provide refrigeration. A pump 22 is employed to circulate weak absorbent solution from absorber 10 to generator 16.

As used herein, the term "weak absorbent solution" refers to solution which is weak in absorbent power, and the term "strong absorbent solution" refers to a solution which is strong in absorbent power. A suitable absorbent for use in the system described is water; a suitable refrigerant is ammonia.

Liquid refrigerant condensed in condenser 12 passes through refrigerant liquid passage 24 to the liquid-suction heat exchanger. The liquid-suction heat exchanger 18 includes a housing 26 having a refrigerant restrictor 28 at the upstream end and a refrigerant restrictor 30 at the downstream end thereof. A portion of the liquid refrigerant supplied to the liquid-suction heat exchanger 18 flashes upon passing through restrictor 28 due to the low pressure existing downstream of the restrictor, thereby cooling the remainder of the refrigerant in the housing 26. The cooled refrigerant liquid and flashed refrigerant vapor then pass through restrictor 30 into heat exchanger 32 of chiller 14.

A heat exchange medium such as water is passed over the exterior of heat exchanger 32 where it is chilled by giving up heat to evaporate the refrigerant within the heat exchanger. The chilled heat exchange medium passes out of the chiller 14 through line 34 to suitable remote heat exchangers (not shown) after which it is returned to the chiller through inlet 36 for rechilling.

The cold refrigerant evaporated in heat exchanger 32, along with a small quantity of absorbent which is carried over to the chiller with the refrigerant from the generator, passes into refrigerant vapor passage 38 of liquid-suction heat exchanger 18. The refrigerant vapor and absorbent liquid, which has a large quantity of refrigerant absorbed therein, passes through refrigerant vapor passage 38 in heat exchange relation with the refrigerant passing through housing 26. Refrigerant vapor passage 38 is provided with a turbulator 40 which consists of a twisted metal strip to provide a tortuous flow path for the vapor to provide optimum heat transfer between the vapor and liquid in passage 38 and the liquid refrigerant in housing 26. By passing the vapor and liquid in passage 38 in heat transfer with the liquid refrigerant in housing 26, a large quantity of refrigerant in the absorbent liquid in passage 38 is vaporized. The heat of vaporization is therefore removed from the liquid in housing 26, thereby reducing the temperature of the liquid refrigerant supplied to heat exchanger 32. This heat transfer within the liquid-suction heat exchanger 18 provides an increase in the absorption machine efficiency by transferring heat from the liquid supplied thereto from the condenser to the refrigerant vapor and absorbent liquid discharged from the chiller. Refrigerant vapor and absorbent solution from passage 38 passes to refrigerant distributor 20 through line 42.

The refrigerant distributor 20, as illustrated in detail in FIG. 2, includes a cylindrical casing 44 serving as a body for the distributor. Bell-shaped member 46, having a necked lower portion, serves as a bottom closure for cylindrical body 44. A plate 48 serves as a top closure for cylindrical body 44. Refrigerant vapor and solution from line 42 passes to the distributor 20 through a vertically extending tubular member 50 which projects upwardly from the necked portion of member 46. Strong solution which is supplied from the generator to distributor 20 through line 52 is discharged into the distributor through a horizontally extending tubular member 54 into the path of refrigerant vapor flowing upwardly therein from tubular member 50 to provide optimum mixing of the refrigerant vapor and the strong solution. Outwardly extending horizontal tubes 56, which communicate with the interior of the distributor near the top portion of casing 44 and project radially therefrom, are provided for passing refrigerant vapor-absorbent solution to individual circuits 58 of the absorber 10. A circular plate 60 having a plurality of openings 62 therein near the periphery thereof is provided for mating engagement with the top surface of tubular member 50 to serve as a check valve and prevent solution from flowing through tubular member 50 into the evaporator when the machine is inoperative. Plate 60 has a diameter greater than the internal diameter of casing 44 and less than the internal diameter of the upper portion of member 46. The bottom portion of casing 44 thereby serves as an upper stop for plate 60 while the internal wall of member 46 serves as a guide therefor. The openings 62 in plate 60 are provided for passage of refrigerant vapor upwardly into casing 44 when the plate is forced against the lower portion of casing 44 by the flow of refrigerant vapor upwardly from tubular sleeve 50.

The absorbent solution-refrigerant vapor mixture is supplied to absorber 10 where a cooling medium, preferably ambient air, is passed over the surface of the absorber in heat exchange relation with the solution therein for cooling the absorbent solution to promote the absorption of the refrigerant vapor by the solution. The same cooling medium may be supplied to condenser 12 in heat exchange relation with refrigerant vapor therein to condense the refrigerant.

Cold weak absorbent solution passes from absorber 10 through line 61 into pump 22. Liquid from pump 22 is passed through line 63 to rectifier heat exchange coil 64. The weak solution passes through coil 64 in heat exchange relation with hot strong solution passing through heat exchange coil 66 disposed within coil 64 and with the hot refrigerant vapor flowing through rectifier shell 68 in contact with the outer surface of coil 64. The weak solution from coil 64 is discharged into the upper portion of generator 16 along with any vapor which is formed in coil 64 due to heat exchange with the hot vapor passing thereover and the hot solution flowing therethrough.

Generator 16 comprises a shell 70 having tapered fins 72 suitably affixed thereto as by welding. The generator is heated by a gas burner 74 or other suitable heating means. The weak solution is boiled in generator 16 to concentrate the solution, thereby forming a strong solution and refrigerant vapor.

The hot strong absorbent solution passes upwardly through the analyzer section of generator 16 through analyzer coil 76 in heat exchange with the weak solution passing downwardly over the coil. The warm strong solution then passes through heat exchange coil 66 within coil 64 and line 52 into the distributor 20. A restrictor 78 is provided in line 52 so that the solution supplied to the vapor distributor 20 is at the same pressure as the vapor in line 42.

Refrigerant vapor formed in generator 16 passes upwardly through the analyzer section thereof where it is concentrated by mass heat transfer with weak solution passing downwardly over analyzer coil 76. Analyzer plates 80 in generator 16 provide a tortuous path for flow of solution and vapor to assure intimate contact therebetween to improve the mass heat transfer. The vapor then passes through rectifier 68 in heat exchange relation with the weak solution passing through coil 64. Absorbent condensed in rectifier 68 flows downwardly into the generator along with the weak solution discharged from coil 64. Refrigerant vapor passes from rectifier 68 through line 82 to condenser 12 to complete the refrigeration cycle.

While we have described a preferred embodiment of our invention, it is to be understood the invention is not limited thereto since it may be otherwise embodied with the scope of the following claims.

We claim:

1. An absorption refrigeration machine having a generator, a condenser, an evaporator, and a multicircuit absorber connected to provide refrigeration,
   a refrigerant distributor adapted to receive strong solution from the generator and refrigerant from the evaporator comprising a casing, said casing including a plurality of first horizontally extending tubular means, each adapted to be connected to a separate circuit of the absorber to supply a mixture of refrigerant and solution thereto, each of said means being disposed in the upper portion of said casing, said casing including refrigerant supply means extending vertically from the bottom of the casing adapted to receive refrigerant vapor from the evaporator, said casing including second horizontally extending tubular means disposed between the refrigerant supply means and the first outwardly extending tubular means, said second horizontally extending tubular means being adapted to discharge strong solution from the generator into the casing in the path of refrigerant discharged upwardly in the casing from the refrigerant supply means to create turbulent flow within the casing thereby mixing the refrigerant vapor and the strong solution prior to discharge through said first horizontally extending tubular means.

2. A refrigeration machine according to claim 1 wherein said refrigerant supply means comprises a tubular member projecting upwardly within said casing, said distributor further including valve means associated with said member to prevent solution flow from the distributor toward said evaporator.

3. A refrigeration machine according to claim 2 wherein said valve means comprises a flat plate adapted for vertical movement within said casing and for seating engagement with the top surface of said member, said plate having a plurality of openings, said openings being located in a portion of said plate having a greater diameter than the diameter of said tubular member.

4. A refrigeration machine according to claim 3 wherein said casing is comprised of a cylindrical tube having a circular top closure and a bell-shaped bottom closure, said vertical member being centered in relation to said bottom closure and projecting upwardly within said bottom closure.

5. An absorption refrigeration machine according to claim 4 wherein said first horizontally extending tubular means project radially outward from said casing wall, said first horizontally extending tubular means terminating flush with the inner surface of said casing walls.

6. A refrigeration machine according to claim 5 wherein the inside diameter of the enlarged portion of said bottom closure is substantially equal to the outside diameter of said cylindrical tube, said valve plate has a diameter less than the inside diameter of the enlarged portion of said bottom closure and greater than the inside diameter of said cylindrical tube so that said plate is vertically movable only within the enlarged portion of said bottom closure, the bottom edge of the wall of said cylindrical tube serving as a stop member to restrict vertical movement of said plate.